United States Patent
Bigda (12)

(10) Patent No.: US 6,860,598 B1
(45) Date of Patent: Mar. 1, 2005

(54) WIND AND NOISE REDUCER FOR EYEGLASSES

(76) Inventor: Daniel R. Bigda, 58 Winnacunnet Rd. #2, Hampton, NH (US) 03842

( * ) Notice: Subject to any disclaimer, the term of this patent is extended or adjusted under 35 U.S.C. 154(b) by 0 days.

(21) Appl. No.: 10/899,583

(22) Filed: Jul. 27, 2004

(51) Int. Cl.[7] .................................................. G02C 5/14
(52) U.S. Cl. ........................... 351/123; 351/122; 2/423; 2/449; 2/209
(58) Field of Search ................................ 351/123, 122, 351/111, 41, 158; 2/423, 449, 209

(56) References Cited

U.S. PATENT DOCUMENTS

| | | |
|---|---|---|
| 3,807,526 A | 4/1974 | Sygrator |
| D314,392 S | 2/1991 | Feinbloom |
| 5,086,789 A | 2/1992 | Tichy |
| 5,201,856 A * | 4/1993 | Edwards ........................ 2/209 |
| 5,323,493 A | 6/1994 | Ogiba |
| 5,402,189 A * | 3/1995 | Gill ............................... 351/44 |
| 5,718,002 A | 2/1998 | Pavlak |
| 5,850,637 A | 12/1998 | Lewis |
| 6,065,157 A * | 5/2000 | Felman .......................... 2/209 |
| 6,286,149 B1 * | 9/2001 | Whitaker ....................... 2/209 |

* cited by examiner

*Primary Examiner*—Hung Xuan Dang

(57) ABSTRACT

A wind and noise reducer for eyeglasses includes a panel that has a top edge, a bottom edge, a forward edge and a rear edge. The forward edge is generally vertically orientated. The panel has an inside surface and an outside surface. The inside surface is concave and the outside surface is convex. An elongated arm has first end and a second end. The first end is attached to the top edge such that the arm is generally horizontally orientated. The arm extends rearward from the panel. A coupler is removably positionable on the temple of the eyeglasses for selectively coupling the arm to the temple such that the arm is orientated parallel to the temple and the forward edge is directed forward of the eyeglasses. The panel may be moved along the temple such that wind is directed around the ears of the wearer of the eyeglasses.

8 Claims, 2 Drawing Sheets

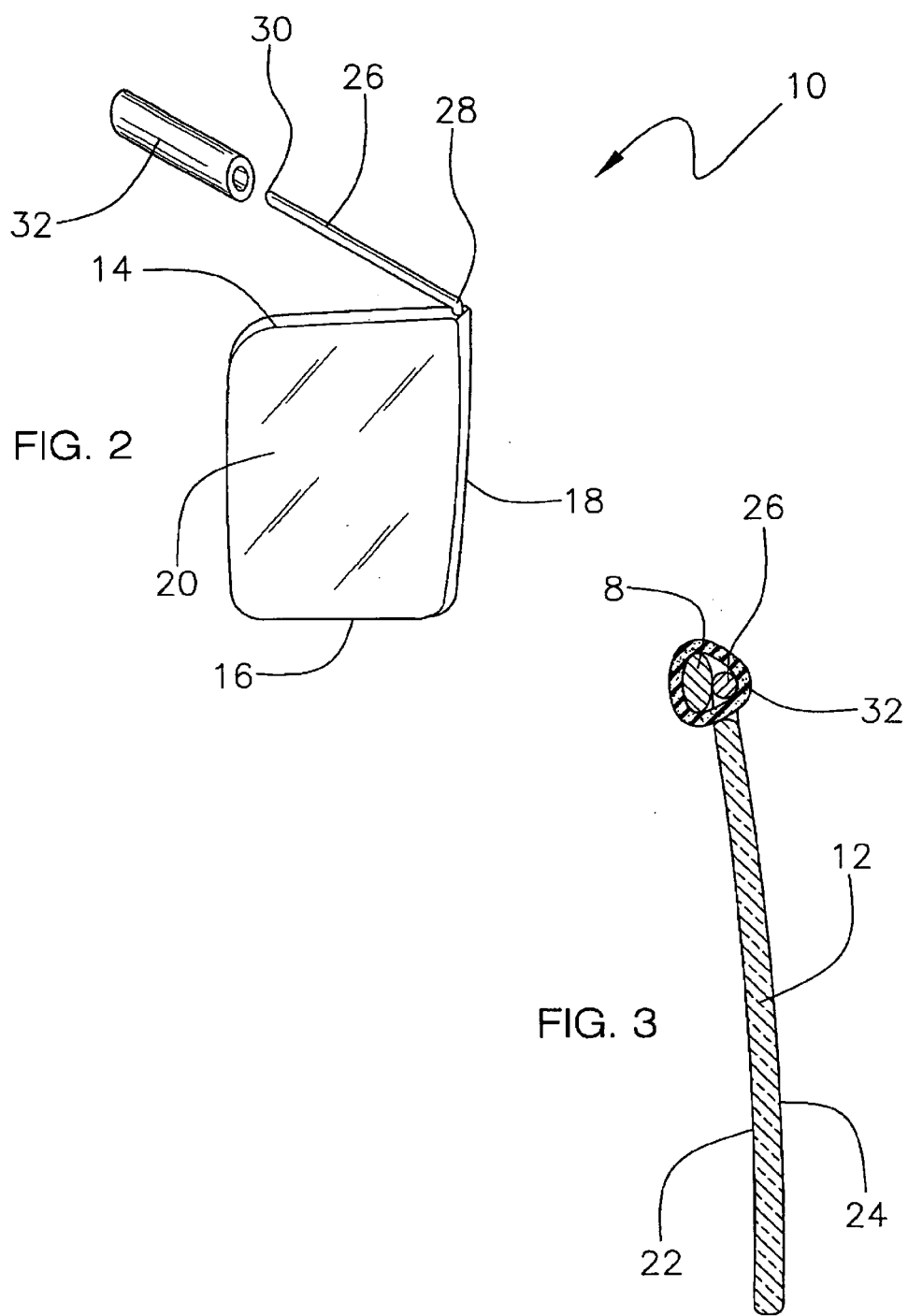

WIND AND NOISE REDUCER FOR EYEGLASSES

BACKGROUND OF THE INVENTION

1. Field of the Invention

The present invention relates to wind reducing devices and more particularly pertains to a new wind reducing device for reducing wind and subsequently the noise produced by the wind as it passes around the ears of a biker and the like.

2. Description of the Prior Art

The use of wind reducing devices is known in the prior art. U.S. Pat. No. 5,086,789 describes a housing that may be attached to eyeglasses and which are adapted for encapsulating the ears. Another type of wind reducing device is U.S. Pat. No. 5,323,493 again having a housing that is mounted to eyeglasses to encompass the ears.

While these devices fulfill their respective, particular objectives and requirements, the need remains for a device that may be readily retrofitted to any eyeglasses and is of lightweight design to ensure maximum comfort while still directing wind and noise around the ears.

SUMMARY OF THE INVENTION

The present invention meets the needs presented above by generally comprising a panel that has a top edge, a bottom edge, a forward edge and a rear edge. The forward edge is generally vertically orientated. The panel has an inside surface and an outside surface. The inside surface is concave and the outside surface is convex. An elongated arm has first end and a second end. The first end is attached to the top edge such that the arm is generally horizontally orientated. The arm extends rearward from the panel. A coupler is removably positionable on the temple of the eyeglasses for selectively coupling the arm to the temple such that the arm is orientated parallel to the temple and the forward edge is directed forward of the eyeglasses. The panel may be moved along the temple such that wind is directed around the ears of the wearer of the eyeglasses.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic perspective view of the present invention.

FIG. 3 is a schematic cross-sectional view taken along line 3—3 of FIG. 1 of the present invention.

DESCRIPTION OF THE PREFERRED EMBODIMENT

Figure 1:
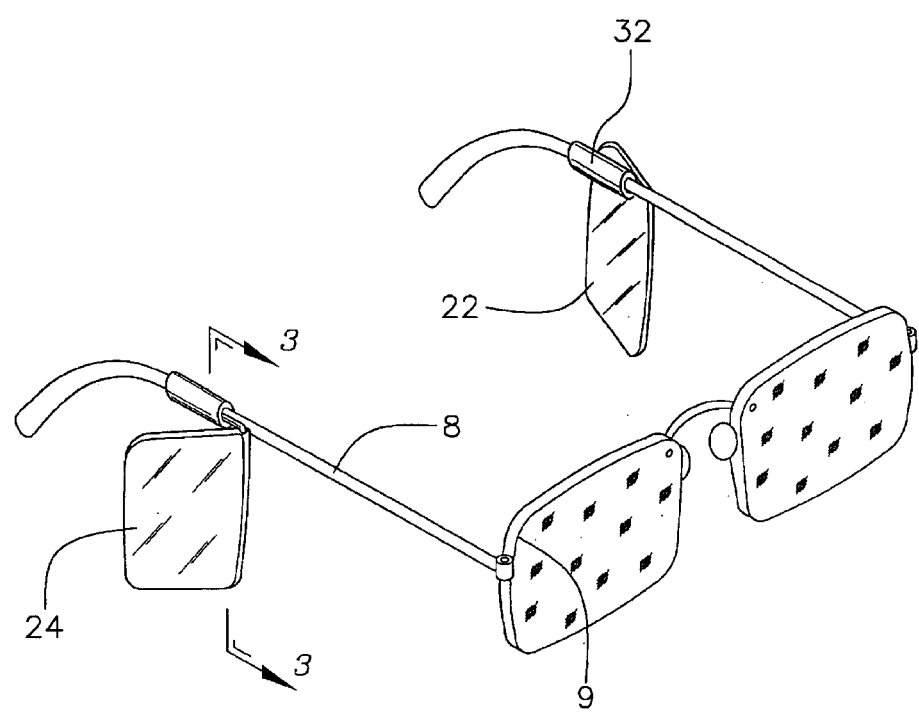
FIG. 1 is a schematic perspective in-use view of a wind and noise reducer for eyeglasses according to the present invention.

With reference now to the drawings, and in particular to FIGS. 1 through 3 thereof, a new wind reducing device embodying the principles and concepts of the present invention and generally designated by the reference numeral 10 will be described.

As best illustrated in FIGS. 1 through 3, the wind and noise reducer for eyeglasses 10 generally comprises a panel 12 having a top edge 14, a bottom edge 16, a forward edge 18 and a rear edge 20. The forward edge 18 is generally vertically orientated. The panel 12 has an inside surface 22 and an outside surface 24. The inside surface 22 is concave and the outside surface 24 is convex. A plane extends rearward through the forward edge 18 and passes into the top 14 and bottom 16 edges where they are adjacent to the forward edge 18. The rear edge 20 is spaced from the plane such that the outside surface 24 moves away from the plane from the forward edge 18 to the rear edge 20. This causes the panel 12 to be swooped outward from the forward 18 to the rear edge 20. It is preferred that adjoining edges of the top 14, bottom 16, forward 18 and rear 20 edges is rounded. The panel 12 is preferably comprised of a plastic material though hard elastomers, glass, metal and other rigid materials may also be used.

An elongated arm 26 has first end 28 and a second end 30. The first end 28 is attached to the top edge 14 such that the arm 26 is generally horizontally orientated and substantially lies within the plane. The arm 26 extends rearward from the panel 12. The panel 12 is angled outwardly away from the second end 30 so that an angle between the top edge 14 of the panel 12 and the arm 26 is generally between 20 degrees and 30 degrees.

A coupler 32 is removably positionable on a temple 8 of eyeglasses 9 for selectively coupling the arm 26 to the temple 8 such that the arm 26 is orientated parallel to the temple 8 and the forward edge 18 is directed forward of the eyeglasses 9. The coupler 32 comprises a resiliently elastic elastomeric sleeve through which the temple 8 may be extended and wherein the arm 26 may be positioned within the sleeve, or coupler 32, and adjacent to the temple 8. The sleeve 32 provides grip on the temple 8 and arm 26 while also allowing for variously sized temples 8.

In use, two panels 12 are provided and each is attached to one of the temples 8 with the couplers 26. The wearer of the eyeglasses 9 places the eyeglasses 9 on their head and moves the panels 12 so that the forward edge 18 is positioned just forward of the ears. This directs oncoming wind to be moved around the ear instead of adjacent to the ear to lower noise created by the wind. In particular, the wind and noise reducer 10 is very useful for bicyclists and the like who are subjected to relatively high velocity of wind and often wear eye protection. The angle between the arm 26 and panel 12 pushes the air outwardly around the ear.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wind blocking device for removably positioning on the temple of eyeglasses, said device comprising:
   a panel having a top edge, a bottom edge, a forward edge and a rear edge, said forward edge being generally vertically orientated, said panel having an inside surface and an outside surface, said inside surface being concave, said outside surface being convex;
   an elongated arm having first end and a second end, said first end being attached to said top edge such that said arm is generally horizontally orientated, said arm extending rearward from said panel;
   a coupler being removably positionable on the temple of the eyeglasses for selectively coupling said arm to the temple such that the arm is orientated parallel to the temple and said forward edge is directed forward of the eyeglasses; and
   wherein said panel may be moved along the temple such that wind is directed around ears of a wearer of the eyeglasses.

2. The device according to claim 1, wherein a plane extends through said forward edge and into said top and bottom edges, said rear edge being spaced from said plane such that said outside surface moves away from said plane from said forward edge to said rear edge.

3. The device according to claim 2, wherein adjoining edges of said top, bottom, forward and rear edges are rounded.

4. The device according to claim 2, wherein said arm substantially lies within said plane.

5. The device according to claim 1, wherein said coupler comprises an elastomeric sleeve through which the temple may be extended and wherein said arm may be positioned within said sleeve and adjacent to the temple.

6. The device according to claim 2, wherein said coupler comprises an elastomeric sleeve through which the temple may be extended and wherein said arm may be positioned within said sleeve and adjacent to the temple.

7. The device according to claim 1, wherein said panel is angled outwardly away from said second end so that an angle between said top edge of said panel 12 and said arm is generally between 20 degrees and 30 degrees.

8. A wind blocking device for removably positioning on the temple of eyeglasses, said device comprising:
   a panel having a top edge, a bottom edge, a forward edge and a rear edge, said forward edge being generally vertically orientated, said panel having an inside surface and an outside surface, said inside surface being concave, said outside surface being convex, a plane extending through said forward edge and into said top and bottom edges, said rear edge being spaced from said plane such that said outside surface moves away from said plane from said forward edge to said rear edge, adjoining edges of said top, bottom, forward and rear edges being rounded;
   an elongated arm having first end and a second end, said first end being attached to said top edge such that said arm is generally horizontally orientated and substantially lies within said plane, said arm extending rearward from said panel, said panel being angled outwardly away from said second end so that an angle between said top edge of said panel 12 and said arm is generally between 20 degrees and 30 degrees;
   a coupler being removably positionable on the temple of the eyeglasses for selectively coupling said arm to the temple such that the arm is orientated parallel to the temple and said forward edge is directed forward of the eyeglasses, said coupler comprising an elastomeric sleeve through which the temple may be extended and wherein said arm may be positioned within said sleeve and adjacent to the temple; and
   wherein said panel may be moved along the temple such that wind is directed around ears of a wearer of the eyeglasses.

\* \* \* \* \*